Sept. 1, 1964     S. G. WAGENSELLER     3,146,668
ZERO-LENGTH LAUNCHER
Filed Nov. 20, 1961
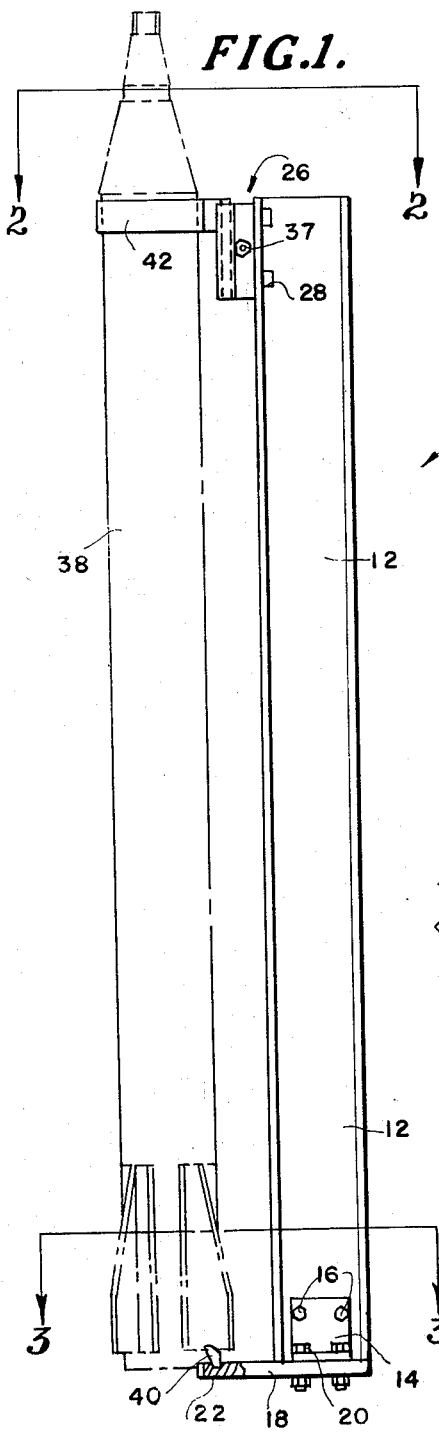
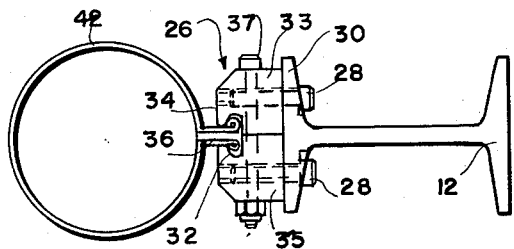
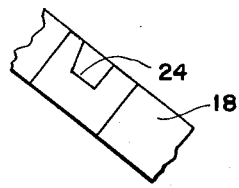
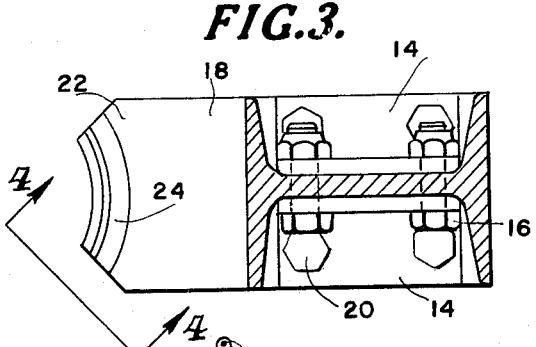
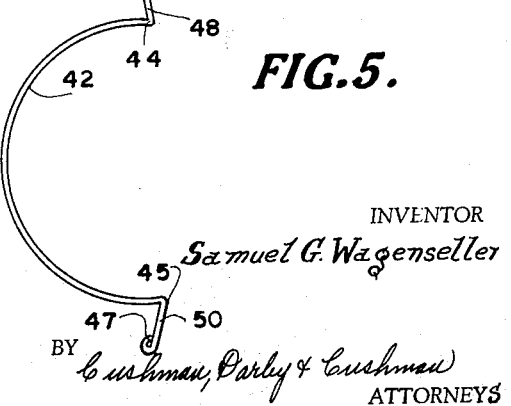
INVENTOR
Samuel G. Wagenseller
BY Cushman, Darby & Cushman
ATTORNEYS

United States Patent Office 3,146,668
Patented Sept. 1, 1964

3,146,668
ZERO-LENGTH LAUNCHER
Samuel G. Wagenseller, Phoenix, Ariz., assignor to Rocket Power, Inc., Mesa, Ariz., a corporation of Arizona
Filed Nov. 20, 1961, Ser. No. 153,550
4 Claims. (Cl. 89—1.7)

This application relates generally to a rocket launcher, and more particularly to a launcher which firmly supports the rocket or missile at both ends while it remains poised thereon, but which will be released and completely disassociated therefrom upon the ignition and lift-off of the missile.

Missile launchers in use prior to the present invention employed fittings such as launcher lugs, clips, and rail shoes which were permanently attached to the booster body. This added considerable weight to the missile, increased drag, and created aerodynamic difficulties. Furthermore, such fittings as were used heretofore, were not adapted for reuse because of their permanent attachment to the rocket booster.

The present invention features a launcher which is inexpensive to manufacture, easily employed, and particularly adapted for use with small missiles. The launcher of the present invention firmly supports the missile at its aft end against downward movement and clamps the periphery of its forward end against lateral movement. Upon lift-off, the aft end of the missile is raised out of engagement from the support plate and at the same time, the forward support means is automatically caused to be released from the rocket body as the same moves upward.

The launching device described herein is compatible with missiles having any type of stabilizing or directional fins, regradless of size. It further serves to reduce the possibility of damage to the missile body when leaving the launcher. Additionally, a launcher having the design of the present invention is light in weight, smaller and less bulky than previous models, and therefore greatly simplified and less expensive.

Accordingly, it is an object of the present invention to provide a zero-length rocket launcher which firmly supports the missile body at both ends thereof, and which will completely disassociate itself therefrom upon lift-off of the same from the launcher.

Another object of this invention is the provision of a missile launcher including a rail member, a plate fastened to one end of the rail member for supporting the missile at one end thereof, a bracket having a recess fastened to the other end of a rail member, and a spring collar encompassing the outer periphery of the missile and having the ends thereof adapted for sliding engagement within the recess.

A further object of this invention is the provision of a supporting plate having an arcuate groove therein for mating engagement with the aft end of the rocket casing.

Still another object of this invention is the provision of a spring collar for encompassing engagement with the missilie body and having the ends thereof extending in a generally radial direction outwardly therefrom, and adapted to be received within the recess of a bracket member.

Yet a further object is the provision of means for supporting the missile at its aft end against downward movement, and means releasably clamping the periphery of the missile at its forward end against lateral movement.

A still further object is the provision of means releasably connected to the supporting means and biasing spring means for clamping engagement with the periphery of the missile at its forward end.

Still a further object is to provide launching apparatus of such a nature that the surface of the missile to be launched will be smooth and unencumbered when in flight.

Other objects and advantages of the present invention will become more apparent from the accompanying description and the appended claims, taken together with the drawings, in which:

FIGURE 1 is a side elevational view of the rocket launcher which forms the basis of the present invention;

FIGURE 2 is a top plan view taken along lines 2—2 of FIGURE 1;

FIGURE 3 is a cross sectional view taken along lines 3—3 of FIGURE 2;

FIGURE 4 is a view taken along lines 4—4 of FIGURE 3; and

FIGURE 5 is a top plan view of the spring collar of FIGURE 2 but shown here in its unattached and relaxed position.

Referring now to the drawings, the rocket launcher which forms the basis of the present invention is generally indicated at 10. It comprises a rail member 12 which is preferably of I-beam construction and has a length which generally corresponds to that of the missile which it supports. It should be understood that the rail member 12 may be supported by conventional methods which form no part of the present invention.

To the base of the rail member 12 are fastened a pair of angle iron clips 14 as by bolts 16 to which is secured the aft launching plate 18 as by bolts 20. The outwardly extending portion 22 of the aft launcher plate 18 is arcuate in shape and includes an arcuate groove 24 located therein, as is clearly seen in FIGURES 3 and 4.

To the upper end of rail member 12 is fastened a bracket member 26 as by cap screws 28 which pass through the flange 30 of the rail member. This construction is clearly seen in FIGURE 2 where bracket member 26 is illustrated as being of two-piece consrtuction as at 33 and 35 and having sutiable bolt means 37 to fasten the two pieces together. It should be understood, however, that the bracket member 26 may also be of one-piece construction if that should be deemed desirable.

The bracket member 26 defines a recess 32 which passes through its entire length from top to bottom as positioned on the rail member 12 and which is open to the surface 34 through opening 36 which is somewhat reduced in size from that of the recess 32.

A missile body which is shown in phantom at 38 is positioned on the rocket launcher in such a manner that the aft casing 40 of the missile body rests within the arcuate groove 24 of the launcher plate 18. A split collar 42, preferably made of spring steel, encompasses the forward end of the rocket body 38. The ends 48 and 50 of the collar 42 are bent as at 44 and 45 and extend outwardly from the missile's periphery in a generally radial direction when the collar is in clamped position thereabout. The tips 46 and 47 of the collar 42 are suitably rolled such that they may be received within the recess 32 of the bracket member 26 and can be introduced to the recess from the top end or the bottom end of the bracket member but cannot be introduced or withdrawn from the bracket member by a lateral movement with respect to the missile body and launch stand 10.

When not in use, the spring collar 42 assumes the relaxed shape shown in FIGURE 5. When the missile is readied for mounting upon the launching stand, the spring band 42 is positioned at a suitable point on its body 38 and the outward extending arms 48 and 50 are drawn together until the spring band firmly engages the outer periphery thereof. The arms 48 and 50 are drawn still closer together until the ends 46 and 47 thereof are receivable within the recess 32. At this point, the ends 46 and 47 are inserted within the recess 32 from the top end of the bracket member 26 and the missile is lowered so that the aft casing 40 thereof rests within the arcuate groove 24 of the aft launching plate 18.

As illustrated in FIGURE 1, the missile is now in position for launching. It is supported on the launching stand 10 against rearward movement by means of the launcher plate 18. It is further held against lateral movement by means of the cooperating members 26 and 42.

Upon lift-off of the missile from the launching stand, the spring collar 42 frictionally engaging the outer periphery of the missile body will be caused to advance therewith until the rolled ends 46 and 47 slide out of the confines of the recess 32. At this point, the collar 42 will spring out of engagement from the periphery of the body 10 falling clear of the rising rocket. The missile is then entirely airborne and has no external fittings which would tend to adversely affect its performance.

It is to be understood that while I have shown a preferred form of my invention, this embodiment is not intended to be limiting. Many variations of the device herein disclosed are possible. The launching rail member 12, for example, need not necessarily be vertical as illustrated, but may be positioned in any other suitable position, even horizontally, as might be advantageous when mounting a missile beneath the wing of an aircraft. Many and various other changes and modifications in form, arrangement of parts, and details of construction thereof may be made without departing from the spirit of the invention, and all such changes and modifications as fall within the scope of the appended claims are contemplated as a part of this invention.

What is claimed is:

1. Apparatus for launching a missile of the type including a relatively smooth exterior periphery adjacent the forward end thereof and fin means adjacent the aft end thereof comprising a launching stand having means for engaging and supporting the aft end of the missile against lateral movement and longitudinal movement in an aft direction and for permitting substantially free longitudinal movement in a forward direction, resiliently biased split collar means resiliently biased for movement from a closed position in surrounding engagement with the smooth exterior periphery of the missile into an open position wherein said collar means moves laterally away from the missile between the ends thereof, and means carried by said launching stand in longitudinally spaced relation from said aft end engaging means for supporting said collar means in said closed position against the resilient bias thereof for movement with the missile during the forward movement of the latter during lift-off and operable to effect release of said collar means after a predetermined movement thereof with the missile to permit biased movement of said collar means from said closed position to said open position and laterally away from the missile between the ends thereof so that the missile is free from any permanent undesirable exterior appendages during flight.

2. Apparatus as defined in claim 1 wherein said collar means in said closed position includes a central circular portion and two end portions extending generally radially therefrom, the extremities of said end portions being bent over to form a substantially T-shaped section and wherein said supporting means for said collar means comprises a member secured to said launching stand and having a T-shaped slot of a size to receive the T-shaped section of said collar means extending longitudinally therein.

3. Apparatus as defined in claim 1 wherein said means for engaging and supporting the aft end of the missile comprises a plate secured to said launching stand and extending outwardly thereof, said plate having an arcuate groove formed in the upper surface thereof for receiving an arcuate portion of the aft extremity of the missile.

4. Apparatus as defined in claim 1 wherein said collar means comprises a strap of resilient material having opposite end portions in said open position spaced apart in a relaxed condition a distance greater than the diameter of the forward end of the missile to be launched and in said closed position retained adjacent each other in a flexed condition.

References Cited in the file of this patent

UNITED STATES PATENTS

| | | |
|---|---|---|
| 1,349,414 | Dougan | Aug. 10, 1920 |
| 2,462,744 | Hasselhorn | Feb. 22, 1949 |
| 2,581,096 | Gould | Jan. 1, 1952 |
| 2,771,811 | Lauritsen | Nov. 27, 1956 |
| 2,987,964 | Logan et al. | June 13, 1961 |
| 3,017,835 | Holtz | Jan. 23, 1962 |
| 3,038,382 | Noyes et al. | June 12, 1962 |